US007933446B2

(12) United States Patent
Lee et al.

(10) Patent No.: US 7,933,446 B2
(45) Date of Patent: Apr. 26, 2011

(54) METHOD AND APPARATUS FOR AUTOMATICALLY DETECTING IMAGE AND CHARACTER DATA

(75) Inventors: Alwin Lee, Fun-Shan (TW); Jim Lin, Chung-Li (TW)

(73) Assignee: Transpacific Optics LLC, Wilmington, DE (US)

( * ) Notice: Subject to any disclaimer, the term of this patent is extended or adjusted under 35 U.S.C. 154(b) by 954 days.

(21) Appl. No.: 10/765,061

(22) Filed: Jan. 28, 2004

(65) Prior Publication Data

US 2005/0162702 A1    Jul. 28, 2005

(51) Int. Cl.
*G06K 9/34* (2006.01)
*H04N 1/387* (2006.01)
(52) U.S. Cl. .................... 382/173; 382/176; 358/452
(58) Field of Classification Search .................. None
See application file for complete search history.

(56) References Cited

U.S. PATENT DOCUMENTS

| 4,996,603 | A | * | 2/1991 | Kanemitsu et al. | 358/462 |
| 5,987,221 | A | * | 11/1999 | Bearss et al. | 358/1.9 |
| 6,556,711 | B2 | * | 4/2003 | Koga et al. | 382/173 |

* cited by examiner

*Primary Examiner* — David K Moore
*Assistant Examiner* — Marcus T Riley
(74) *Attorney, Agent, or Firm* — Perkins Coie LLP

(57) ABSTRACT

The present invention discloses a halftone processing of image and text auto detection, which is used to keep both the bit depth of images and the clarity of text when faxing or copying documents. The process of the present invention is stated as follows: choose the background color from the master copy, separate the content of the master copy into images and text with the chosen background color as the criterion, process the images with halftone processing, process the text with line art processing, and then output the processed images and processed text as a whole.

16 Claims, 5 Drawing Sheets

METHOD AND APPARATUS FOR AUTOMATICALLY DETECTING IMAGE AND CHARACTER DATA

BACKGROUND OF THE INVENTION

1. Field of the Invention

The present invention generally relates to a method of automatically detecting images and text, and then process the images and text separately, especially relates to increase the clarity of both monochrome and color documents when faxing or copying them.

2. Background Description

Nowadays, when people deal with the copying and faxing of color documents (or gray-scale documents), in order to raise the clarity of the copies and reduce the distortion of the copies, they have to process the image and text of the master copy separately because of the different characters of images and text.

For example, when a gray scale document is faxed, it is usually transformed to monochrome mode. When being transformed, the content of the document will not be able to present the original clarity and resolution without distort if the transformation is not done with halftone processing (halftone, including dithering and diffusion), because the content contains both images and text. Moreover, if all content of the document is half toned, the text will be scattered. As a result, traditionally, the images and text will be processed separately.

However, the current processing method which deals with images and text separately, ignores the problem of low speed in order to keep the genuineness and the quality of the copy or fax. That is, the current images and text detection is implemented by hardware, which processes the original images (smear or blur it) and then separates images and text; it costs more to use hardware to process images and takes more time to detect the images and text because of the extra process. Moreover, the current halftone processing takes more transformation time because there are more sampling points and a larger sampling zone.

SUMMARY OF THE INVENTION

While there is incompetence in the conventional arts stated in the background of invention above, one of the goals of the present invention is to propose a method to separate image and text area, which quickly separate images and text based on the character of bit depth distribution, in order to reduce the halftone processing zone.

The other goal is to decrease the sampling points of halftone processing in order to reduce the process time.

Based on the goals above, the present invention offers a halftone processing of images and text auto detection, which includes the following steps: choosing a background color from a master copy, separating the content of the master copy into images and text with the chosen background color as the criterion, processing the images with halftone processing, processing the text with line art processing, and outputting the processed images and processed text as a whole.

In the present invention stated above, the halftone processing is a dithering, and the dithering equation is the sampling mode in the FIG. 5 (mark 50) times one sixty-eighth.

In the present invention stated above, a preferred embodiment comprises choosing a first background color from a master copy, separating the content of the master copy into images and text with the first background color as the criterion, condensing the master copy based on the first background color, cutting transversely the condensed master copy based on the first background color, cutting vertically the transversely cut master copy based on the first background color; thus, there will be several individual areas, choosing a second background color from the individual areas, identifying images and text based on the second background color, marking the individual areas with images as an image area, marking the individual areas with text as a text area, if the individual areas cannot be identified, replacing the first background color with the second background color, condensing the unidentifiable individual areas based on the second background color, and then repeating the steps above, processing the images with halftone processing, . . . processing the text with line art processing, and outputting the processed images and processed text as a whole.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The following is a detailed description of the present invention. However, other than the detailed description, the present can also be widely implemented in other embodiment, and the scope of the present invention is not limited and is based on the future patent scope.

Moreover, to provide more detailed description and clearer understanding of the present invention, the figures are not drawn according to the corresponding scale. Some measurement and scale have been exaggerated and some unrelated details are not drawn, in order to make the figure concise.

Figure 1:
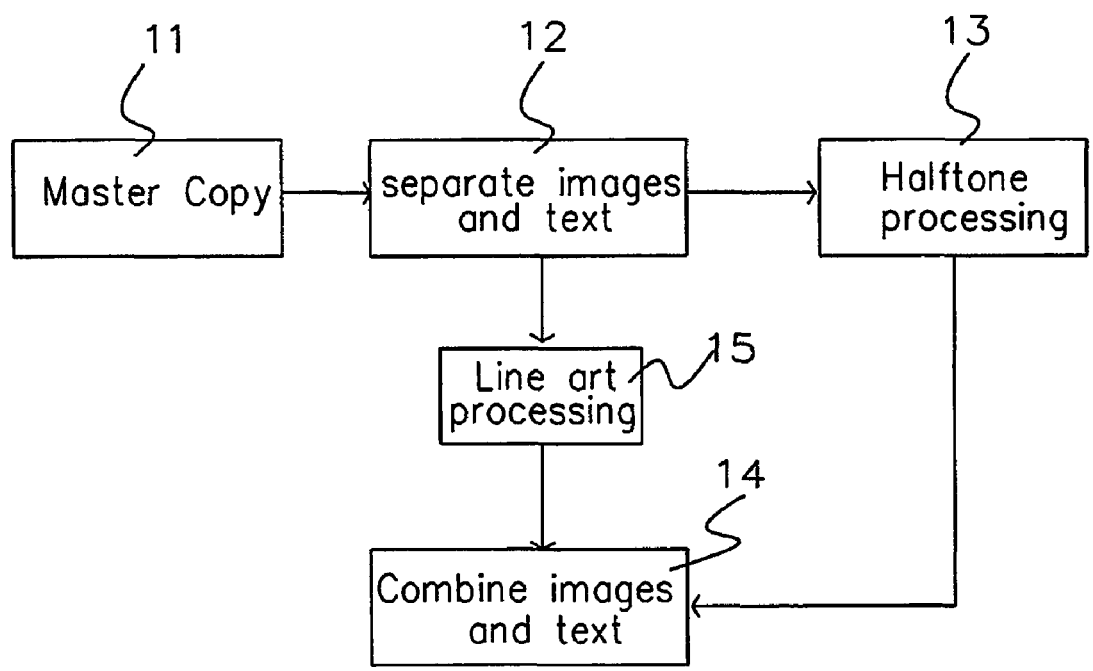
FIG. 1 is an illustration of the present invention.

The present invention is illustrated in the FIG. 1, firstly, detect 11 the image and text areas included in the master copy; secondly, separate images and text 12 (the procedure is illustrated in the FIG. 2); thirdly, half tone 13 the images (halftone processing, the preferred embodiment takes one of the halftone processing methods, dithering processing, as an example) to obtain the best resolution and process the text with line art processing 15; then combine 14 the processed images and text to fax or copy the master copy with a clear tone level gradation of images and text.

Figure 3:
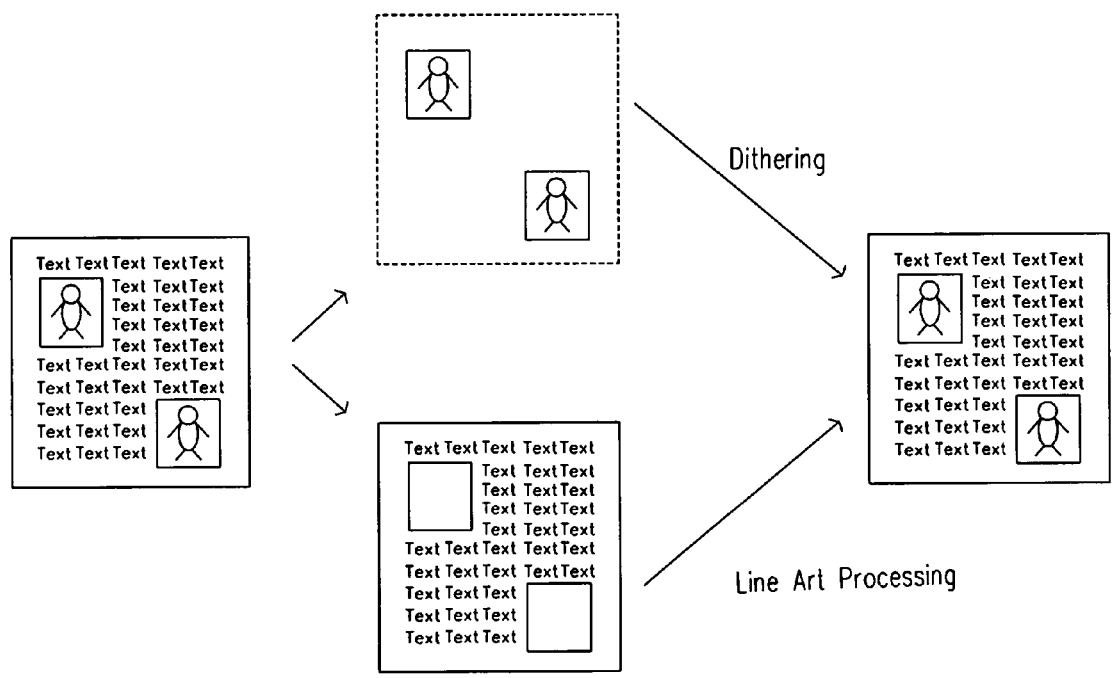
FIG. 3 shows the images and text processed respectively.

One thing to be noted is that there are different ways of halftone processing, such as dithering, ordered dithering, error diffusion, and so on. The present invention takes dithering as an embodiment. In dithering, which is illustrated in the FIG. 3, the images and text are identified in a master copy with both image and text, and different areas are dithered separately. Thus, when there is a gray scale in an area (generally, there can be 0 (darkest) to 255 (brightest)), can present a clear tone level gradation. Of course, the gray scale can be divided into 1024 levels; this depends on the demand of the designer. Then, the text is line art processed, which means there are only two values (either 0 (darkest) or 255 (brightest)) for text, so the text area can be presented clearly. Lastly, the processed images and text are combined, to make the images and text of the finished copy clear.

Figure 5:
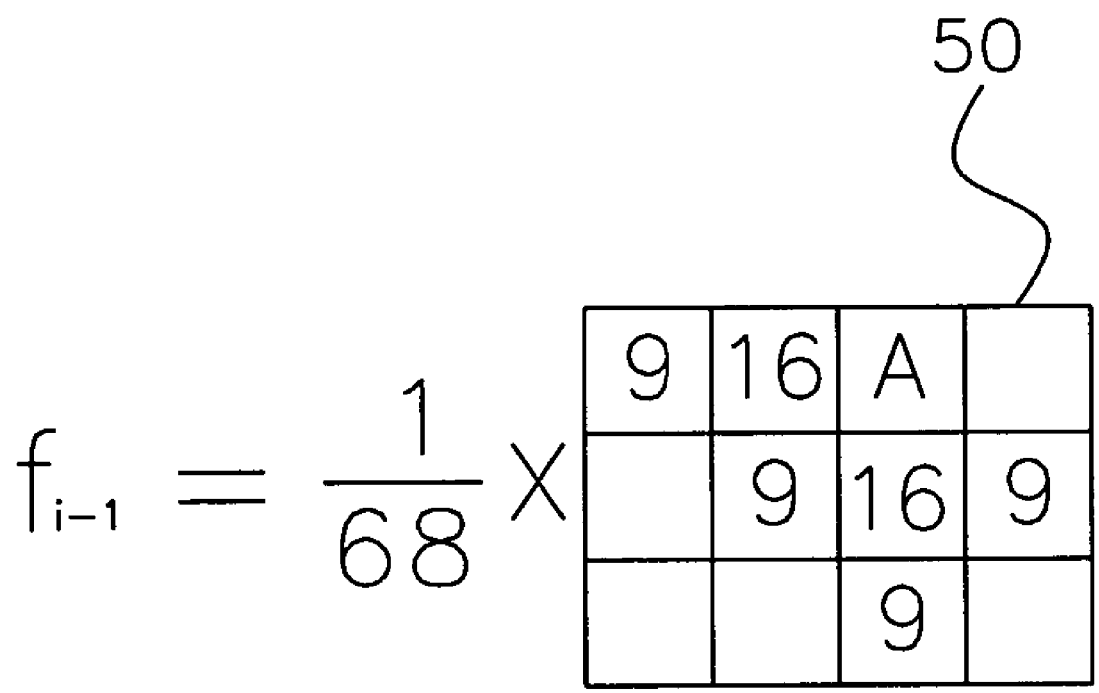
FIG. 5 shows the equation and sampling mode of the dithering in the present invention.

The sampling method of the dithering stated above is illustrated in the FIG. 5, the dithering equation is the adjacent pixels times one sixty-eighth based on the sampling mode in the FIG. 5 (marked as 50).

Figure 2:
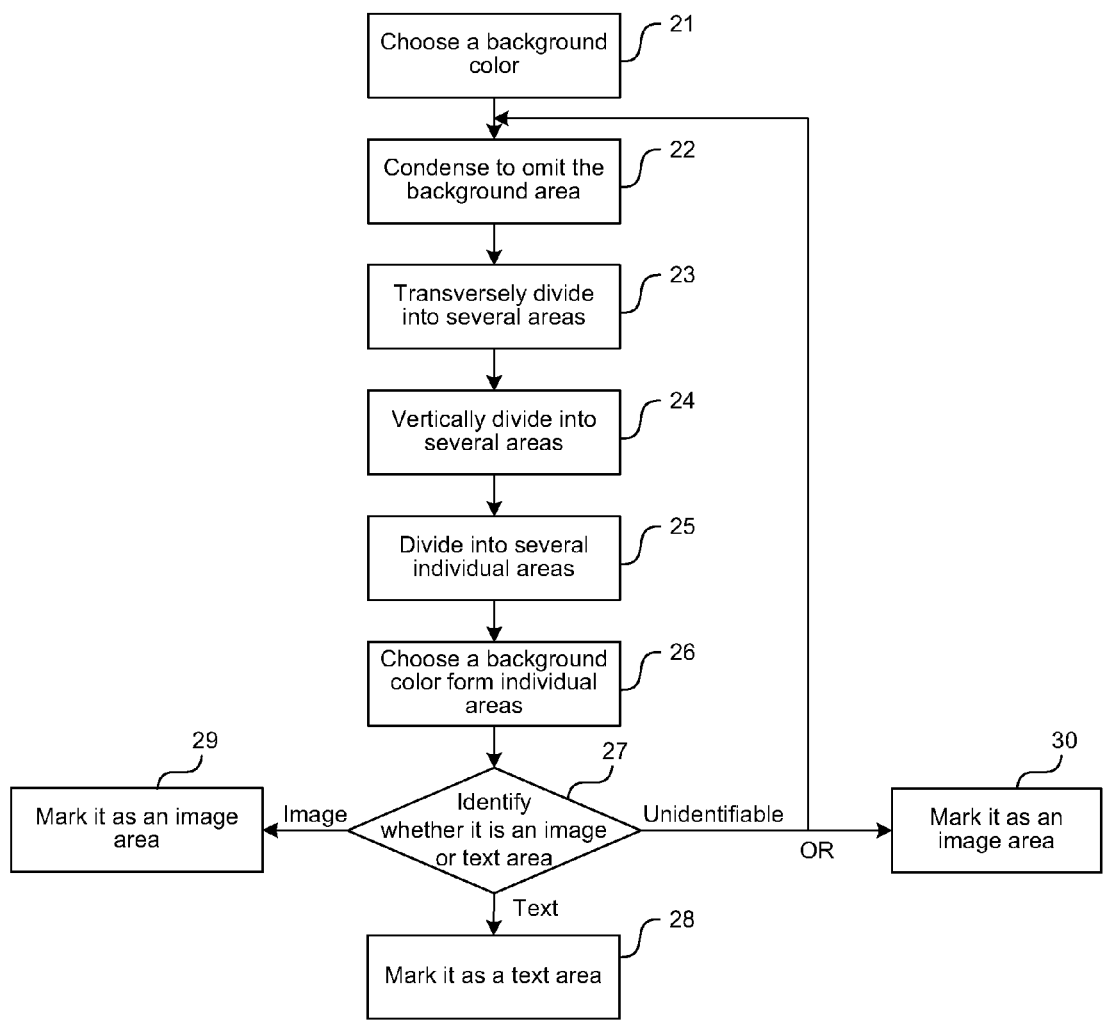
FIG. 2 shows the method and detailed steps of the automatically detecting image and text.

The method of detecting and separating images and text is illustrated in the FIG. 2, it comprises:

Choosing a background color from images or text areas which are going to be detected (step 21), Condensing the master copy based on the first background color (step 22), Cutting transversely the condensed area (step 23), Cutting vertically the transversely cut area (step 24), Thus, the original area can be divided into several individual areas (step 25), Choosing a background color from the individual areas (step 26), Identifying images and text based on the second background color (step 27), If the individual areas cannot be identified, it is possible that the area contains smaller image and text region.

Therefore, use the chosen background color or choose another background color, back to step 22, and repeat the auto-detection process, Marking the individual areas with images as an image area (step 29), Marking the individual areas with text as a text area (step 28).

In step 23, if the area cannot be transversely cut, jump to step 24 and vertically cut it. If, in step 24, the area cannot be vertically cut, jump to step 26. In special cases, the area may not be transversely cut as step 23, vertically cut as step 24, or identified image or text, mark it as an image area (shown as step 30 in the FIG. 2).

Figure 4:
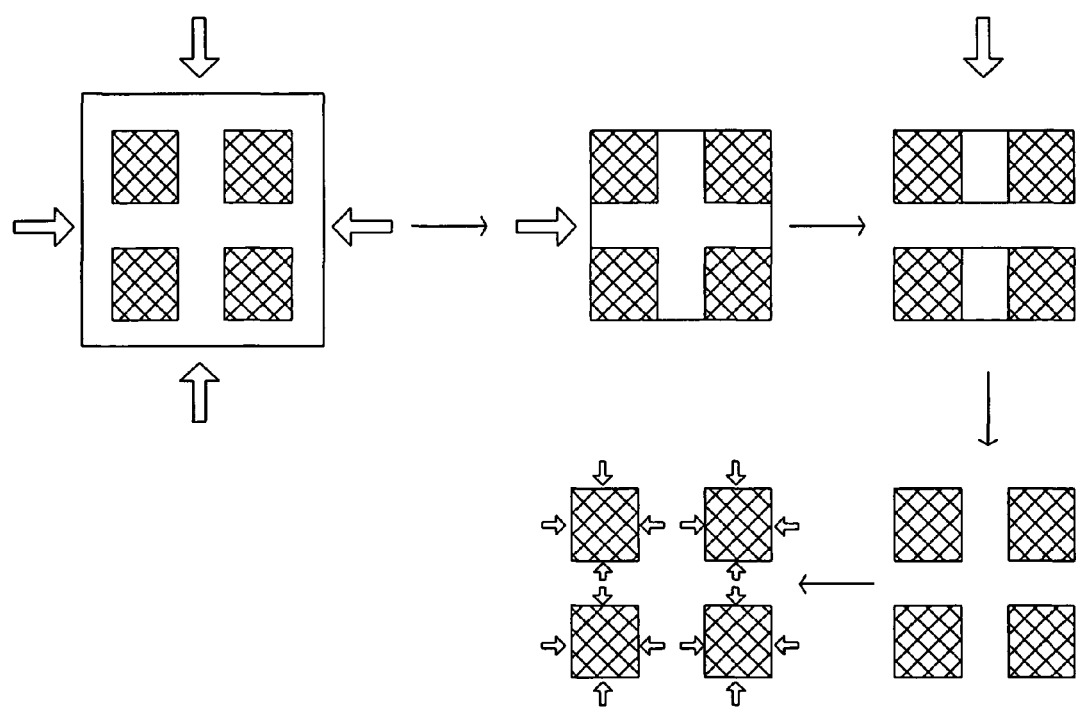
FIG. 4 is an embodiment of the condensing process to the master copy of the present invention.

The method of automatically detecting images and text is better illustrated in the FIG. 4. As shown in the FIG. 4, a master copy area is firstly condensed with the chosen background color, in order to omit the area containing neither image nor text and save the time of halftone processing or line art processing (because the more area to be processed, the more time the whole process will take). Then, transversely and vertically cut the condensed area, which will divide the condensed area into several individual areas, and identify whether the individual areas are image areas or text areas with either hardware or software. Lastly, if an individual area cannot be identified whether it is an image or text area, repeat the process of condensing, transversely cutting, and vertically cutting on the individual area.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

The invention claimed is:

1. A method, performed by a device having a processor, of detecting images and text in a master copy, the method comprising:

choosing a first background color from the master copy, wherein the master copy includes an image portion, a text portion, and an empty portion containing neither an image nor text;

condensing the master copy based at least in part on the first background color by omitting the empty portion to create a condensed copy of the master copy, the condensed copy containing the image portion and the text portion;

transversely and vertically dividing the entirety of the condensed copy into a plurality of first areas;

for each of the first areas
choosing a second background color from the first area;
determining whether the first area includes the image portion or the text portion based at least in part on the second background color;
if the first area includes the image portion, marking the first area as an image area;
if the first area includes the text portion, marking the first area as a text area; and
if a determination that the first area includes the image portion or the text portion is not made, then either
marking the first area as an image area, or
replacing the first background color with the second background color;
condensing the first area based at least in part on the second background color;
transversely and vertically dividing the first area into a plurality of second areas; and
for each of the second areas
determining whether the second area includes the image portion or the text portion based at least in part on the second background color;
if the second area includes an image portion, marking the second area as an image area; and
if the second area includes a text portion, marking the second area as a text area,
wherein at least one first area is marked as an image area in response to the determination that the at least one first area includes the image portion or the text portion not being made;

processing, by the device, the image areas with halftone processing;

processing, by the device, the text areas with line art processing; and outputting the processed images and processed text as a whole.

2. The method of claim 1, wherein the halftone processing comprises a dithering process.

3. The method of claim 2, wherein the dithering process comprises a sampling mode dithering.

4. A method, performed by a device having a processor, for identifying image areas and text areas in a document, the method comprising:

choosing a document background color based on the document;

creating a condensed document from the document by omitting areas based at least in part on the chosen document background color;

dividing the condensed document into a plurality of individual areas;

for each of the individual areas,
choosing an area background color based on the individual area;
determining if the individual area contains image or text based at least in part on the chosen area background color;
if the determination is that the individual area contains image, marking the individual area as an image area; and
if the determination is that the individual area contains text, marking the individual area as a text area;

if the determination that the individual area contains image or text is not made, performing an additional action;

for at least a first individual area for which the determination that the first individual area contains image or text is not made, performing an additional action includes marking the first individual area as an image area;

processing, by the device, individual areas marked as image areas with halftone processing; and processing, by the device, individual areas marked as text areas with line art processing.

5. The method of claim 4, wherein dividing the condensed document includes dividing the condensed document transversely and vertically into a plurality of individual areas, and the method further includes:

for at least a second individual area for which the determination that the second individual area contains image or text is not made, performing an additional action includes:

omitting sub-areas in the second individual area based at least in part on the chosen area background color to create a condensed area;

dividing the condensed area into a plurality of individual sub-areas; and for each of the individual sub-areas,
choosing a sub-area background color based on the individual sub-area, and
identifying the individual sub-area as containing image or text based at least in part on the chosen sub-area background color.

6. The method of claim 4, wherein identifying the individual area as containing image or text includes identifying the individual area as containing image or text based on bit depth distribution, the identified image area containing an image, the area background color, and the document background color, the identified text areas containing text, the area background color, and the document background color.

7. The method of claim 4, wherein choosing an area background color includes choosing an area background color that is different than the document background color.

8. The method of claim 4, wherein choosing an area background color includes choosing an area background color that is the same as the document background color.

9. A method, performed by a device having a processor, for identifying an image area and a text area in an original document, the method comprising:

choosing a document background color based on the original document;

creating a condensed document from the original document by omitting areas based at least in part on the chosen document background color;

dividing the condensed document into at least a first area, a second area, and a third area;

detecting a first area background color of the first area;

marking the first area as a first image area based at least in part on the detected first area background color, the first area containing at least an image and the first area background color;

detecting a second area background color of the second area;

marking the second area as a text area based at least in part on the detected second area background color, the second area containing at least text and the second area background color;

determining if the third area contains at least an image or at least text;

if the determination that the third area contains at least an image or at least text is not made, marking the third area as a second image area;

processing, by the device, the first and second image areas with halftone processing; and processing, by the device, the text area with line art processing.

10. The method of claim 9, wherein dividing the condensed document includes dividing the condensed document transversely or vertically into at least the first area, the second area, and the third area.

11. The method of claim 1, wherein outputting the processed images and processed text as a whole includes faxing the processed images and processed text.

12. The method of claim 1, further comprising copying the master copy.

13. The method of claim 4, further comprising faxing the processed areas.

14. The method of claim 4, further comprising copying the document.

15. The method of claim 9, further comprising faxing the processed image area and the processed text area.

16. The method of claim 9, further comprising copying the original document.

* * * * *